UNITED STATES PATENT OFFICE.

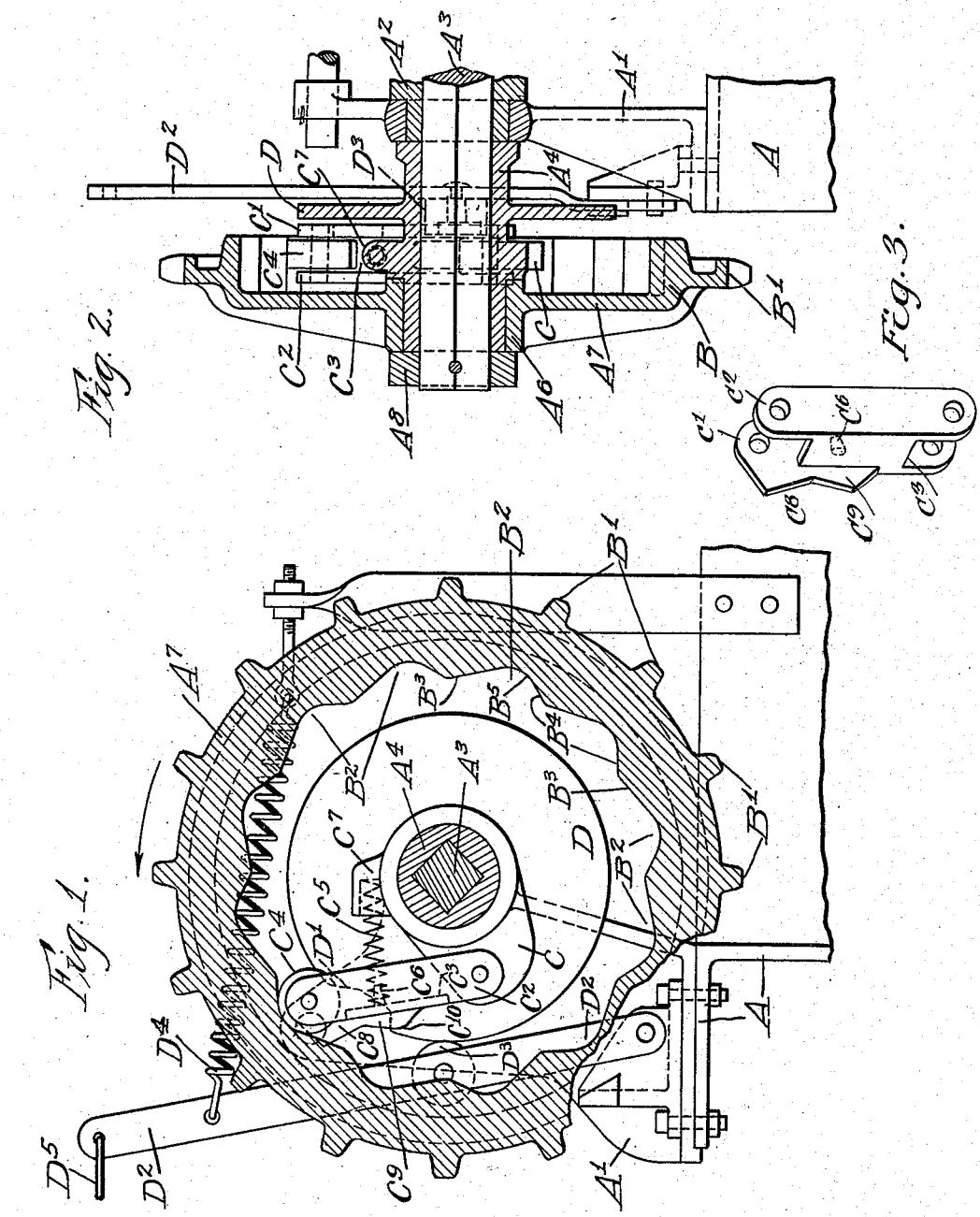

WILLIAM H. C. HIGGINS, JR., OF LAPORTE, INDIANA, ASSIGNOR TO M. RUMELY CO., OF LAPORTE, INDIANA, A CORPORATION OF INDIANA.

CLUTCH.

1,166,457.  Specification of Letters Patent.  Patented Jan. 4, 1916.

Application filed October 28, 1914.  Serial No. 869,035.

*To all whom it may concern:*

Be it known that I, WILLIAM H. C. HIGGINS, JR., a citizen of the United States, residing at Laporte, in the county of Laporte and State of Indiana, have invented a certain new and useful Improvement in Clutches, of which the following is a specification.

My invention relates to improvements in clutches and has for one object to provide a new and improved form of clutch which may be used particularly in agricultural machinery, plow lifts and the like. It is illustrated in one form in the accompanying drawing, wherein—

Figure 1 is a transverse section; and Fig. 2 is a longitudinal section at right angles to Fig. 1. Fig. 3 shows a detailed perspective view.

Like parts are indicated by like letters throughout the several figures.

A is a frame. $A^1$ a bracket thereon; $A^2$ a bearing sleeve rotatably mounted therein. $A^3$ is a square shaft held in the bearing sleeve $A^2$. $A^4$ is a sleeve mounted on the shaft $A^3$. Upon it is rotatably mounted the hub $A^6$ of a clutch wheel or disk $A^7$. This hub is held against longitudinal movement with respect to the sleeve $A^4$ by the cap $A^8$ which holds the shaft, sleeves and hub all in operative relation.

B is a rim projecting outwardly from one side of the wheel or disk $A^7$ and carrying about its outer periphery the sprocket teeth $B^1$ adapted to engage any power source not here shown and about this inner periphery the notches $B^2$ as indicated. It will be noted that these notches are unsymmetrical being made up of two inclined plane surfaces $B^3$, $B^4$, one longer than the other and joined by a curved bottom $B^5$. It will be noted that these notches are so arranged that the short side $B^4$ is when the clutch is rotating in its normal direction the rear side of the notch.

C is an arm projecting outwardly from the sleeve $A^4$ in the same plane as the rim B. It is integral with the sleeve $A^4$ and carries pivotally mounted thereon the two parallel links $C^1$, $C^2$ one on either side thereof. These links are joined together by a web $C^3$ and carry rotatably mounted at their outer end a roller $C^4$ which roller is pressed into engagement with the notches $B^2$ on the rim B by a spring $C^5$ which is in engagement at one end with a stud $C^6$ and at the other end with a lug $C^7$ on the sleeve $A^4$.

$C^8$ is a cam plate mounted on the web $C^3$ and having immediately adjacent the roller $C^4$, the disengaging cam surface $C^9$ and adjacent the center of the links a locking cam surface $C^{10}$.

D is a guide plate rigidly mounted on the sleeve $A^4$ and notched at one place in its periphery as indicated at $D^1$.

$D^2$, $D^2$ is a control lever pivotally mounted on the bracket $A^1$ having a roller $D^3$ adapted to ride along the periphery of the disk D.

$D^4$ is a spring anchored at one end on the bracket and at the other on the lever $D^2$ tending normally to thrust the roller $D^3$ against the periphery of the disk D.

$D^5$ is a control rod leading from the lever $D^2$ to any suitable operative point not here shown.

It will be evident that while I have shown in my drawings an operative device, still many changes might be made both in size, shape and arrangements of parts, without departing materially from the spirit of my invention, and I wish, therefore, that my drawings be regarded as in a sense diagrammatic.

The use and operation of my invention is as follows: The clutch disk is, in my preferred form, the driving part and the shaft the driven part. The light compression spring normally presses the roller out against the notched surface of the clutch rim and the short side wall of the notch pressing against the roller which is held in the notch by the spring exerts a turning moment on the fixed arm which projects from the sleeve. The result is that as the clutch disk or wheel rotates it must carry with it the sleeve. However, while this sleeve rotates it carries also the control disk D and as this disk rotates a point is finally reached at which the roller on the control lever engages the outer releasing cam surface on the roller carrying links. This commences the release of the roller pressing it away from the notches in the clutch against the light compression spring because of the superior strength of the tension spring. Meanwhile the roller is dropping into the notch on the control disk and comes into engagement with the locking cam surface and then completely thrusts the roller back toward the shaft to disengage it from the notch or serrated clutch ring. The sprocket clutch is then free to rotate leaving the shaft at rest. All that is needed to again start the rotation of the shaft is to pull on the rope and draw the clutch control lever away allowing the compression spring to enter the notched wheel when the shaft will commence another rotation. Since the action is started the control lever can be allowed to drop back and the roller will ride along the periphery of the disk until the next complete revolution has been made. It will be noted that the relative angular position of the notch in the control disk and the lever or arm on the sleeve is fixed so that the clutch will be disengaged at the end of each complete revolution.

I claim:

1. A clutch comprising a ring, a driving connection therefor, a shaft about which the ring is mounted free to rotate, an arm on the shaft, a link pivoted thereon, yielding means for forcing the free end of the link against the inner periphery of the ring, automatic means for disengaging the end of the link and the ring at the end of each revolution of the shaft.

2. A clutch comprising a ring, a driving connection therefor, a shaft about which the ring is mounted free to rotate, an arm on the shaft, a link pivoted thereon, yielding means for forcing the free end of the link against the inner periphery of the ring, automatic means for disengaging the end of the link and the ring at the end of each revolution of the shaft, said means comprising a control member and yielding means for forcing it against the link.

3. A clutch comprising a ring, a driving connection therefor, a shaft about which the ring is mounted free to rotate, an arm on the shaft, a link pivoted thereon, yielding means for forcing the free end of the link against the inner periphery of the ring, a disk notched adjacent to the link mounted on the shaft and a control member riding upon said disk in the path of said link to throw the link out of engagement with the ring.

4. A clutch comprising a ring, a driving connection therefor, a shaft about which the ring is mounted free to rotate, an arm on the shaft, a link pivoted thereon, yielding means for forcing the free end of the link against the inner periphery of the ring, a disk notched adjacent to the link mounted on the shaft and a control member riding upon said disk in the path of said link to throw the link out of engagement with the ring and yielding means for forcing said control member into said notch to rotate the link and complete the disengagement of the link and collar.

5. A clutch comprising a ring having a notched inner periphery, a driving connection therefor, a shaft about which the ring is mounted free to rotate, an arm on the shaft, a link pivoted thereon, yielding means for forcing the free end of the link against the inner periphery of the ring, automatic means for disengaging the end of the link and the ring at the end of each revolution of the shaft.

6. A clutch comprising a ring having a notched inner periphery, a shaft about which the ring is mounted free to rotate, an arm on the shaft, a link pivoted thereon, yielding means for forcing the free end of the link against the inner periphery of the ring, automatic means for disengaging the end of the link and the ring at the end of each revolution of the shaft, said means comprising a control member and yielding means for forcing it against the link responsive to the rotation of the shaft.

7. A clutch comprising a ring having a notched inner periphery, a driving connection therefor, a shaft about which the ring is mounted free to rotate, an arm on the shaft, a link pivoted thereon, yielding means for forcing the free end of the link against the inner periphery of the ring, a disk notched adjacent to the link mounted on the shaft and a control member riding upon said disk in the path of said link to throw the link out of engagement with the ring.

8. A clutch comprising a ring having a notched inner periphery, a driving connection therefor, a shaft about which the ring is mounted free to rotate, an arm on the shaft, a link pivoted thereon, yielding means for forcing the free end of the link against the inner periphery of the ring, a disk notched adjacent to the link mounted on the shaft and a control member riding upon said disk in the path of said link to throw the link out of engagement with the ring and yielding means for forcing said control member into said notch to rotate the link and complete the disengagement of the link and collar.

9. A clutch comprising a ring, a driving connection therefor, a shaft about which the ring is mounted free to rotate, an arm on the shaft, a link pivoted thereon, yielding means for forcing the free end of the link against the inner periphery of the ring, a cam surface carried by the link, a disk rigidly mounted on the shaft notched adjacent said cam surface, a control lever, a roller thereon and yielding means for pressing said roller against the periphery of said disk.

10. A clutch comprising an annular inwardly notched ring, a shaft about which this ring is mounted for rotation, an arm projecting from said shaft, a link pivoted on said arm, means for yieldingly thrusting the free end of said link into engagement with the notches of said ring, a notch control disk mounted upon said shaft, a plurality of cam surfaces projecting from said link, a control lever, a roller thereon in engagement with said disk and in the same plane as said cam surfaces, yielding means for pressing said roller against the disk and a control for said disk.

11. A clutch comprising a wheel, a ring projecting therefrom, a driving connection about the periphery of the ring, the inside of the ring being notched, a shaft upon which the wheel is mounted for rotation, an arm mounted on the shaft, a link pivoted on the arm, a contact member on the end of the link and yielding means for pressing it against the notches in the ring, a disk mounted on the shaft and notched at one place adjacent said link, cam surfaces carried by said link adjacent said notch, a control lever, a roller thereon, yielding means for pressing said roller against the periphery of said disk and means for controlling said lever.

In testimony whereof, I affix my signature in the presence of two witnesses this 22nd day of October, 1914.

WILLIAM H. C. HIGGINS, JR.

Witnesses:
A. F. MOHR,
JOHN A. SECOR.

Copies of this patent may be obtained for five cents each, by addressing the "Commissioner of Patents, Washington, D. C."